(12) United States Patent
Collazo

(10) Patent No.: US 10,486,581 B2
(45) Date of Patent: Nov. 26, 2019

(54) ROLLER-DRAWBAR WITH ARMS FOR LIFTING

(71) Applicant: Enrique Collazo, Palm City, FL (US)

(72) Inventor: Enrique Collazo, Palm City, FL (US)

( * ) Notice: Subject to any disclaimer, the term of this patent is extended or adjusted under 35 U.S.C. 154(b) by 0 days.

(21) Appl. No.: 15/157,703

(22) Filed: May 18, 2016

(65) Prior Publication Data

US 2016/0347229 A1 Dec. 1, 2016

Related U.S. Application Data

(60) Provisional application No. 62/166,048, filed on May 25, 2015.

(51) Int. Cl.
*B60P 3/12* (2006.01)

(52) U.S. Cl.
CPC .................................. *B60P 3/125* (2013.01)

(58) Field of Classification Search
USPC ....................................................... 280/402
See application file for complete search history.

(56) References Cited

U.S. PATENT DOCUMENTS

| | | | | | |
|---|---|---|---|---|---|
| 4,451,193 A | * | 5/1984 | Cannon, Jr. | ............. | B60P 3/125 280/402 |
| 4,657,468 A | * | 4/1987 | Youmans | ................ | B60P 3/125 280/402 |
| 4,854,803 A | * | 8/1989 | Coccaro | ................ | B60B 29/002 414/429 |
| 7,494,313 B2 | * | 2/2009 | Craze | ...................... | B60P 3/125 414/563 |
| 8,016,303 B1 | * | 9/2011 | Ullman | ................. | B62B 5/0083 280/79.4 |
| 9,302,543 B1 | * | 4/2016 | Pierce | ..................... | B60B 30/10 |
| 2007/0075511 A1 | * | 4/2007 | Shubert | ................ | B62D 43/002 280/79.4 |

* cited by examiner

*Primary Examiner* — Joseph M Rocca
*Assistant Examiner* — Felicia L. Brittman
(74) *Attorney, Agent, or Firm* — Shaddock Law Group, PC

(57) ABSTRACT

A roller-drawbar raises and supports drive wheels of a vehicle being towed off of the ground surface while rollers fitted onto each lifting and supporting drawbar arm causes the drive wheels to rotate while being towed preventing damage to the vehicle's drivetrain during the towing process is taught. The inventive principles include a pivotable roller-drawbar designed so that a wrecker can back-up to a vehicle to be repossessed and easily and rapidly position the roller-drawbar under the vehicle to securely lift and support its drive wheels. Relying on the pivotability of the roller-drawbar, the vehicle to be repossessed can be removed from its parking space even if the vehicle is parallel parked tightly between two other vehicles without damaging any vehicles parked close-by and towed to a safer location in just a couple of minutes without any damage to the repossessed vehicle or its drivetrain.

20 Claims, 7 Drawing Sheets

CURRENTLY AVAILABLE ART

ROLLER-DRAWBAR WITH ARMS FOR LIFTING

CROSS-REFERENCE TO RELATED APPLICATIONS

This is a Non-Provisional Application of Provisional Application No. 62/166,048 filed on May 25, 2015.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to drawbars for wreckers or "snatch" trucks and, more particularly, to a roller-drawbar with arms for lifting providing for free rotation of lifted drive-wheels.

The background information discussed below is presented to better illustrate the novelty and usefulness of the present invention. This background information is not admitted prior art.

From time to time, vehicles must be moved by external force or without the assistance of a driver for the vehicle. These situations may arise when automobiles become disabled due to, for example, mechanical or electrical malfunctions. At other times, automobiles may be deemed to be parked illegally. At still others, repossession of the automobile may be desired by a creditor due to lack of payment or otherwise.

Towing vehicles is never easy, but some tow jobs are more challenging than others. In many states, creditors can seize (repossess) a vehicle as soon as the purchaser defaults on the loan or lease. "Repo" towing (towing for repossession) presents a unique set of challenges that may pose serious dangers to the repro driver. Repo drivers (also referred to as "recovery agents" or "adjusters" in the trade) work long hours for uncertain pay. Repro drivers often work on commission and are paid only if the car is repossessed. Once a car to be repossessed is located, the repro driver waits until it is left unattended before starting the repossession procedure. Repo agents often must work in areas in which the purchasers of the vehicle to be repossessed live. This means that the neighborhoods could be of lower income and sometimes rough requiring repo agents to always be aware of their surroundings. People who know their vehicle is to be repossessed often hide their car or block it in using other vehicles, making it difficult, if not impossible to repossess the car. When there is contact between a Repo-drive and a debtor, the debtor is often angry and can be physically intimidating and may even become violent as their property is being repossessed. Thus, repo towing can be dangerous because the purchasers often will go to some length to keep their vehicle outside of the repossesser's reach. It is known that Repo men suffer blows, kicks, knife and even gunshot wounds from angry debtors. In the United States, one or two repo men are killed each year while on the job making it easy to understand why repo-drivers want to repossess a vehicle as quickly as possible and want to avoid getting out of the towing vehicle, if they can. Some states require that all repossessions happen without creating a "breach of the peace," which means that if the owner notices that repossession is in progress and comes out of the house and makes a scene, the repo-driver cannot legally repossess the car.

Repossessing a car usually entails towing the repossessed vehicle to an impoundment area. Towing vehicles, however, can be problematic. One option is to use what is referred to as a "tow bar". One example of a tow bar is a rigid set of bars in the shape of a triangle that connects the vehicle being towed to the towing vehicle. The use of a tow bar results in all of the four wheels of the towed vehicle rolling on the ground surface for the duration of the tow. This means that precautions will have to be taken to protect the transmission because if the drive wheels of a towed vehicle remain on the ground during towing, there is a risk of severely damaging the gear system of the transmission.

To protect damage to the gear system, the simplest solution is to use a flatbed trailer to haul the vehicle so that all four wheels are kept off of the ground. With this technique, there's no need to worry about transmission damage. You just load up the car or truck and go. If it is not possible to use a flatbed other options will have to be considered. Another method used by the towing industry is to use 'tow dollies' to recover vehicles. A tow dolly is designed to be coupled to an automobile's powered wheels. The drive wheels, whether the front wheels of a front-wheel drive automobile, or the rear wheels of a rear-wheel drive automobile are locked onto the tow dolly's tray and the tow dolly is hitched to a tow truck.

The technique more used today employs a wrecker that tows vehicles by lifting either the front or rear wheels off the ground. More modern types of wreckers include "underlift" or "wheel-lift" wreckers. An underlift wrecker engages and lifts the vehicle to be towed at its frame members, whereas a wheel-lift wrecker engages and lifts front or rear wheels of the vehicle to be towed. Wheel-lift wreckers often employ a telescoping or folding main crossbar element attached to the rear of the truck and extend rearwardly from or out beyond the truck's rear deck. The crossbar element represents the main lifting or leverage component for lifting one end of the vehicle to be towed. Such wreckers also use an apparatus for engaging and holding the front or rear wheels of the vehicle to be towed. The wheel engaging apparatus (wheel cradle) typically includes a crossbar (also referred to as a "wheel boom") pivotally attached to the end of a tow bar or main boom, and wheel retainers or lifting arms for engaging the wheels of the vehicle to be towed. When positioning the system for towing, the crossbar is maneuvered into a position against the tread of the tires and the lifting arms are then locked into a position securing the tires in place against the crossbar.

SUMMARY

The present inventor, knowing the difficulty and dangers that Repo men face while doing their job realized that to make the job easier and safer would require means to reduce the time it takes to repossess a vehicle, even when the vehicle is tightly parallel parked between two adjacent vehicles. A vehicle to be repossessed tightly parallel parked between two vehicles presents both time and maneuvering problems to the repo man. There are safety issues that may occur during repossession when a repo man must take extra time to get the vehicle up onto a flatbed, or to position a dolly under the vehicle's drive wheels, or dollies under both sets of tires in the event that it is a four wheel drive.

Accordingly, to accomplish repossession in a minute or two while safeguarding the drive train of the vehicle being repossessed, the present inventor construed an inventive concept of an improved wheel-lift assembly, that herein is referred to as a roller-drawbar, removeably attachable to a tow truck, wrecker, or the like, for raising and supporting a vehicle's two drive wheels from contact with the ground surface. The roller-drawbar of the present invention has rollers fitted onto the drawbar that provide for the lifted and supported drive wheels of the vehicle being towed to continue to rotate while the vehicle is being towed, thus, preventing damage to the vehicle's drivetrain and its related systems during the towing process. The inventive principles include a pivotable roller-drawbar designed so that a wrecker can back-up to a vehicle to be repossessed and easily and rapidly position the roller-drawbar so that it securely lifts and supports two of the vehicles drive wheels, even if the vehicle is parallel parked tightly between two other vehicles. Relying on the pivotability of the roller-drawbar, the vehicle to be repossessed can be removed from its parking space without damaging any vehicles parked close-by and towed to a safer location in just a couple of minutes without any damage to the repossessed vehicle or its drivetrain. Providing for the safety of the drive train are the novel rollers fitted onto the drawbar that provide for the drive wheels of the vehicle being towed to rotate while being supported by the rollers.

The present Inventor recognized that many repo-drivers rely more on speed than stealth. In this case, a repo-driver will usually park the truck out of sight until it is determined if the vehicle is front-wheel or rear-wheel drive. When it is time, the repo-driver will approach the vehicle with the tow truck and deploy the pivotable roller-drawbar, preferably controlling the pivotable roller-drawbar with a hydraulic control mechanism inside the truck's cab so that the driver does not have to leave the safety of the cab. If the car is parallel parked, the hydraulic control provides for the pivotable roller-drawbar to be turned sideways and slid into position from the side. The entire operation can be completed in roughly 10 seconds.

Stealth is also accommodated by the principles of the present invention. In the example illustrated, the pivotable roller-drawbar is to be mounted beneath a tow truck or wrecker. Using the truck's hydraulic power mechanism controlled from within the cab, the pivotable roller-drawbar can be folded-up to become invisible when not in use. When roller-drawbar use is required, again using the truck's hydraulic power mechanism, the roller-drawbar is lowered to near the ground surface and the arms of the pivotable roller-drawbar are unfolded. The pivotable roller-drawbar is then extended under the vehicle to be repossessed so that the lifting and supporting arms of the roller-drawbar can be positioned about the vehicle's drive wheels to lift and support the drive wheels with the novel feature of having rollers on the lifting and supporting arms that provide for the drive wheels of the vehicle being repossessed to rotate while the non-drive wheels are in motion. When the repo is complete the towing mechanism folds back into the bed, out of sight.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF THE REFERENCE NUMERALS AND PARTS TO WHICH THEY REFER

Figure 1:
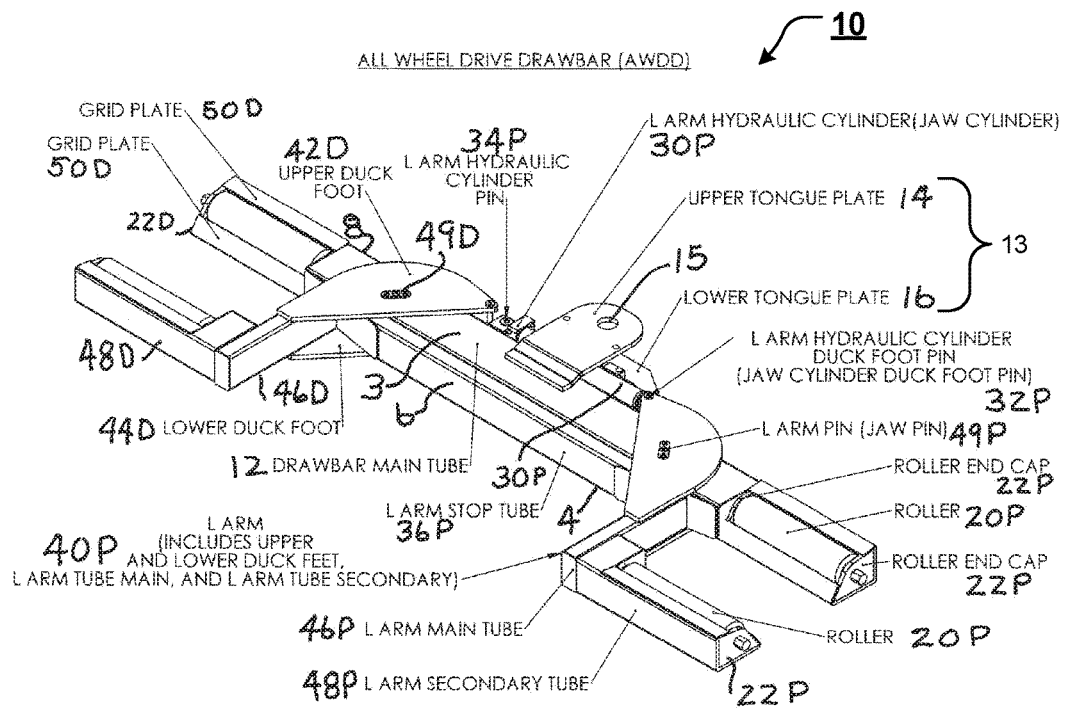
FIG. 1 is an oblique perspective view of a roller-drawbar according to the present invention.
Figure 2:
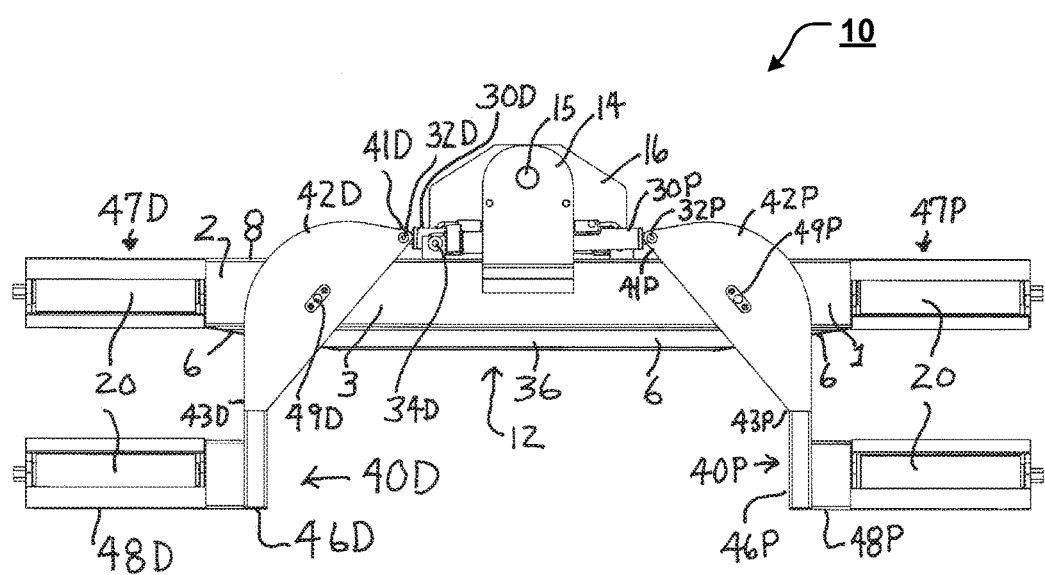
FIG. 2 is a plan view of a top surface of the drawbar as shown in FIG. 1.
Figure 3:
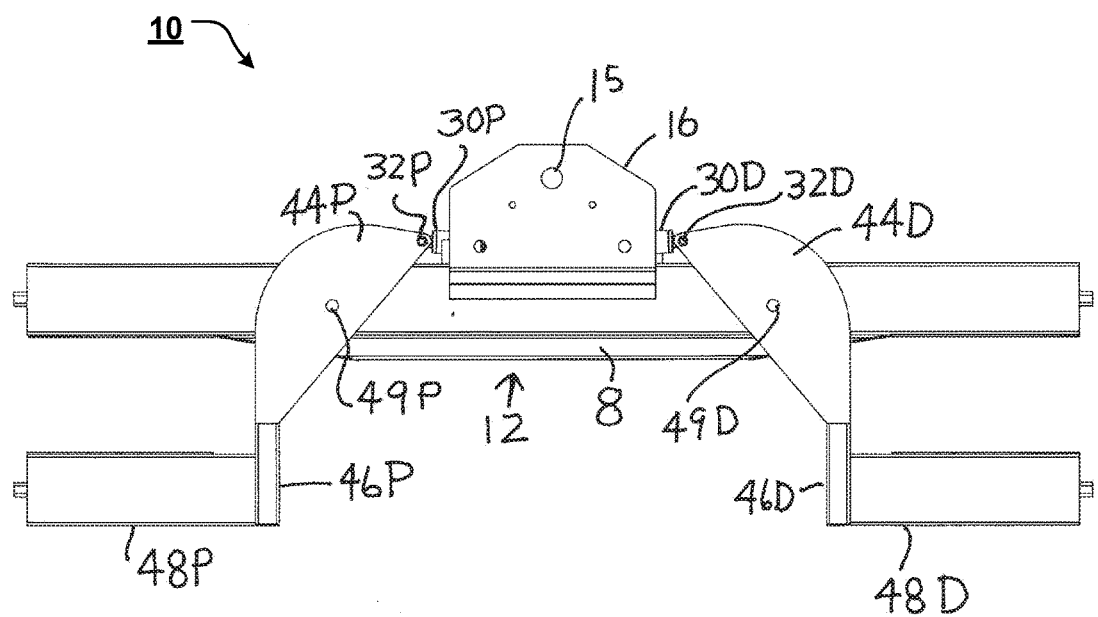
FIG. 3 is a plan view of a bottom surface of the drawbar shown in FIG. 1.

Note: "P" indicates "passenger's side" and "D" indicates "driver's side," as used below.
1 A first end of drawbar main tube 12.
2 A second end of drawbar main tube 12.
3 Top surface of drawbar main tube 12.
4 Bottom surface of drawbar main tube 12.
6 Front surface of drawbar main tube 12.
8 Rear surface of drawbar main tube 12.
10 Roller-drawbar according to the present invention.
12 Drawbar main tube.
13 Attachment fixture.
14 Upper tongue plate of 13.
15 King pin pivot point of 13.
16 Lower tongue plate of 13.
20 Roller.
22P Roller end cap.
22D Roller end cap.
30P Passenger's side hydraulic cylinder arm (jaw cylinder).
30D Driver's side hydraulic cylinder arm (jaw cylinder).
32P Duck foot pin for passenger's side hydraulic cylinder arm 30P.
32D Duck foot pin for driver's side hydraulic cylinder arm.
34P Pin for passenger's side hydraulic cylinder arm.
34D Pin for driver's hydraulic cylinder arm.
40P Passenger's side L-arm assembly (includes passenger's side upper 42P and lower duck feet 44P, passenger's side L-arm main tube 46P and passenger's arm secondary tube 48P).
40D Driver's side L-arm assembly (includes driver's side upper 42D and lower 44D duck feet, driver's side L-arm main tube 46D and driver's side L-arm secondary tube 48D).
41P Narrow end of upper duck foot on passenger's or first side of drawbar.
41D Narrow end of upper duck foot on driver's or second side of drawbar
42P Upper duck foot on passenger or first side of drawbar.

42D Upper duck foot on driver's or second side of drawbar
43P Narrow end of upper duck foot on passenger or first side of drawbar.
43D Narrow end of upper duck foot on driver's or second side of drawbar
44P Lower duck foot on passenger's or first side of drawbar.
44D Lower duck foot on driver's or second side of drawbar.
46D Driver's side rotatable lifting L-arm main tube.
46P Passenger's side rotatable lifting L-arm main tube.
47D Driver's side stationary lifting arm.
47P Passenger's side stationary lifting arm.
48D Driver's side lifting L-arm secondary tube.
48P Passenger's side lifting L-arm secondary tube.
49D Driver's side lifting L-arm pin (jaw pin).
49P Passenger's side lifting L-arm pin (jaw pin).
50D Driver's side lifting L-arm grid plates.
50P Passenger's side lifting L-arm grid plates.
51D Driver's side roller pin.
51P Passenger's side roller pin.

DEFINITIONS

Coupling or coupled, as used herein, refers to coupled elements that have an effectual relationship realizable by a direct connection or indirectly with one or more other intervening elements.

Drawbar, is used herein to refer to currently available towing assemblies designed to engage the lower portion of the tires of one axle of a vehicle to be towed with a bar or portions of a front bar extending across the width of the tires and engaging the lower rear of the same tires with a further rear bar or bar portions also extending across the width of the tires so that, when the front and rear bar or bar portions are raised, the vehicle tires rest on and partially between the front and rear bar or bar portions. Such towing assemblies are referred to as drawbars by those in the industry. The term drawbar may be used to refer to a solid coupling between a hauling vehicle and its hauled load. The term drawbar, which may also be used to refer to a drawbar with arms for lifting, differs in that there is a pivotable coupling mechanism to which is attached an elongated main bar with a lifting arm set of stationary arms and rotatable L-shaped arms at each end. When the main bar is positioned near the ground surface and near the vehicle to be towed, the extending outward rotatable lifting L-shaped arms of the drawbar can be folded inwardly toward the center of the main bar so as to be easily inserted between the vehicle's two drive wheels while the stationary lifting arms of the drawbar are positioned to be in contact with the facing outward side of each drive wheel. At that time, the folded inwardly L-shaped arms are unfolded so that each of the unfolded arms is in contact with the inwardly facing side of each of the drive wheels of the vehicle to be towed. Thus positioned, the two sets of lifting arms become wheel mounts that can lift and support the drive wheels of the vehicle being towed. If this type of towing is practiced without the rollers on each of the arms as taught by the present invention the drive-train of the vehicle being towed is likely to be damaged.

Pivot point is the tow-truck to drawbar or roller-drawbar pivotable connection located in the tongue.

Roller-drawbar with arms for lifting, as used herein, refers to the present invention that is a pivotable roller-drawbar mounted on a tow truck, such as a wrecker or such, to couple the tow truck to a vehicle to be towed while protecting the drive-train of the vehicle being towed. The roller-drawbar is structurally and functionally different from currently available drawbars in that each of the extending outward L-shaped arms and each end of the main bar is fitted with a roller that together provide for the drive wheels of a vehicle being towed to continue to rotate while the vehicle is in motion, preventing damage to the drive train of the vehicle being towed.

Tongue, as used herein, refers to the mechanical connection or coupler between a tow-truck and a drawbar or roller-drawbar.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

Referring now to the drawings in more detail, FIG. 1-FIG. 6 disclose pivotable roller-drawbar assembly 10 made in accordance with the inventive concept of the present invention. The roller-drawbar comprises a set of rotatable L-shaped roller lifting arms that cooperate with a set of stationary, non-rotatable lifting roller arms to lift and support the drive wheels of a vehicle to be towed. The following description of one exemplary embodiment of the roller-drawbar invention should not be taken as limiting. There are many ways to construct a roller-drawbar, including what is described herein, such as providing for a drawbar's basic structural parts being manufactured by molding and all embodiments are contemplated in the present invention. What follows is a description of one embodiment to provide an understanding of the principles of the inventive concept. Drawbar main tube 12, also referred to in the trade as a crossbar or a main bar, has top 3, bottom 4, front 6, and rear 8 surfaces and two longitudinally opposing ends, first end 1 and second end 2. Note, that the designations first end and second end are for explanatory purposes only; passenger's and driver's side, respectively are also used for explanatory purposes. Stationary lifting roller arm 47P is fixedly attached to and extends from the first end of the main tube and stationary lifting roller arm 47D is fixedly attached to and extends from the second end of main tube 12 forming a stationary lifting roller arm on each end of main tube 12. Each stationary lifting roller arm, 47D and 47P, is fitted with a roller 20. Roller 20 is secured to each stationary roller arm, 47D and 47P, by roller end cap 22D and roller end cap 22P, respectively. In an aspect of an embodiment of the present invention, each roller 20 is secured to each stationary roller arm, 47D and 47P by way of roller pins 51D (for the driver's side) and 51P (for the passenger's side) which are positioned through each roller 20. In an aspect of an embodiment of the present invention, each roller 20 is secured to each stationary roller arm, 47D and 47P by way of roller pins 51D (for the driver's side) and 51P (for the passenger's side), with each roller pin 51D and 51P extending from each roller cap 22D and 22P respectively and through each roller 20. Rollers 20 are rotatable about roller pins 51D and 51P, thereby enabling rotation of rollers 20. Midway between the first and second end of the main tube there is fixed attachment fixture 13 that rotatably and removeably attaches roller-drawbar 10 to a wrecker or the like. The exemplar attachment fixture illustrated includes upper tongue plate 14 hingedly attached, by a hinge, (not shown) to lower tongue plate 16. Each plate has a corresponding cooperating aperture 15 through which a king pin is accepted providing for a king pin pivot point (discussed in more detail below). It should be understood that the described manner of attaching the roller-drawbar to a towing vehicle should not be understood as limiting. The principles of the present invention contemplate any rotatable attachment fixture that will function as intended to be included in the variations for attachment. Attached to and extending from a first side of attachment fixture 13 is passenger's side hydraulic cylinder arm 30 and Attached to and extending from a second side of attachment fixture 13 is passenger's side hydraulic cylinder arm 30D. Rotatably attached to each side of attachment fixture 13 is a duck foot assembly that can be described as follows. Upper duck foot 42P is secured to lower duck foot 44P by pivoting arm pin (jaw pin) connector 49P that extends through upper duck foot 42P, top surface 3 of drawbar main tube 12, bottom surface 4 of drawbar main tube 12, to lower duck foot 44P. Upper and lower duck feet 42D and 44D are connected in an analogous manner. Each of the four duck feet has a set of two narrowed ends 41P, 41D, 43P, and 43D. Each of the narrowed ends 43D and 43P of upper duck feet 42D and 42P, respectively, extends outwardly past front surface 6 of drawbar main tube 12 and are fixedly attached to rotatable lifting arm main tubes 46D and 46P, respectively. Each of the narrowed ends 41D and 41P of upper duck feet 42D and 42P, respectively, are pivotably attached to cylinders 30D and 30P, respectively, by hydraulic jaw cylinder duck foot pin connectors 32D and 32P. Extending outwardly from the longitudinal end of lifting roller L-arm main tube 46P parallel to the long axis of drawbar main tube 12 is lifting roller L-arm secondary tube 48P. Rotatably mounted to L-arm secondary tube 48P is roller 20. Roller 20 is secured to L-arm secondary tube 48P by roller end caps 22P. Analogously, extending outward from the longitudinal end of lifting L-arm main tube 46D to be parallel to the long axis of drawbar main tube 12 is left-arm secondary tube 48D. Rotatably mounted to L-arm secondary tube 48D is roller 20. Roller 20 is secured within secondary tube 48D by roller end caps 22D. This structural coupling of rotatable lifting L-arm 46D with stationary lifting arm 47D along with the structural coupling of rotatable lifting L-arm 46P with stationary lifting arm 47P creates the two sets of wheel-lift and support units that constitute the wheel-lift and support assembly of present invention. After the drive wheels of the vehicle to be towed are lifted by the lifting arms, it is the rotation of rollers 20 about respective roller pins 51D and 51P that enable rotation of the drive wheels of the vehicle to be towed while the vehicle is being towed, thereby preventing damage to the drive train of the vehicle being towed.

Figure 4:
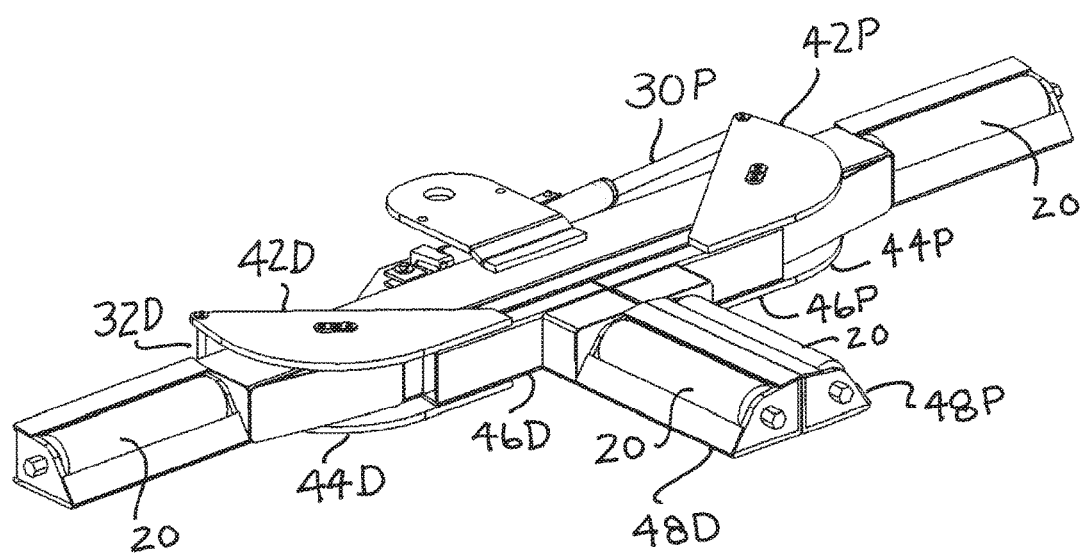
FIG. 4 is an oblique perspective view of the drawbar as shown in FIG. 1 in a ready for use position.
Figure 5:
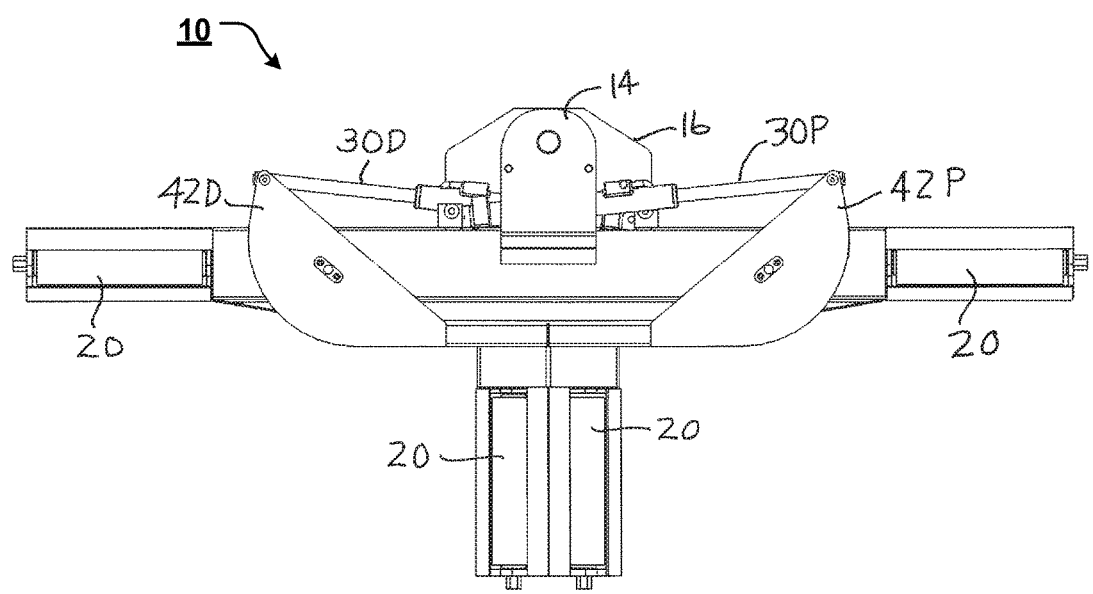
FIG. 5 is a top view of the drawbar as shown in FIG. 1 in a ready for use position.
Figure 6:
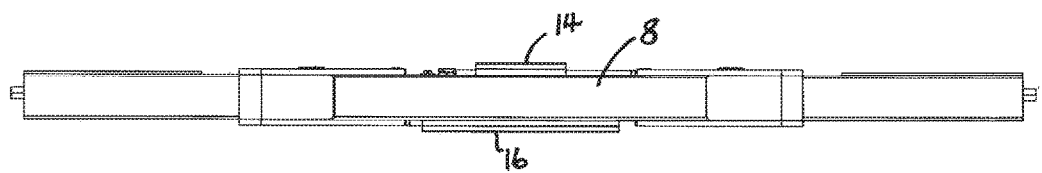
FIG. 6 is an elevation view of a backside of the drawbar shown in FIG. 1.

To use pivotable roller-drawbar 10 for its intended use of lifting, supporting a vehicle being towed while providing for the drive wheels of the vehicle being towed to rotate while the vehicle is moving, the two sets of wheel-lift and support units that constitute wheel-lift and support assembly of present invention must be inserted beneath the vehicle to be towed so that each set of rollers securely embraces one of the vehicle's two drive wheels. It should be understood that the functional coupling of roller lifting arms 46D and 47D constitute one set of lifting arms and that the functional coupling of roller lifting arms 46P and 47P constitute the second set of set of lifting arms. To have each set of roller lifting arms embrace a drive wheel of the vehicle to be towed, the drawbar first must be lowered to near the ground surface near the vehicle to be towed with the rotatable lifting L-shaped arms 46D and 46P of the drawbar folded inwardly toward the center of the main bar 12 so to be easily inserted between the vehicles two drive wheels while the stationary lifting arms 47D and 47P of the drawbar are positioned to be in contact with the facing outward side of each drive wheel. At that time, the folded inwardly L-shaped arms 46D and 46P are unfolded so that each of the unfolded arms is in contact with the inwardly facing side of each of the drive wheels of the vehicle to be towed. Thus positioned, the two sets of lifting arms become wheel mounts that can lift and support the drive wheels of the vehicle being towed. Noting that each lifting arm is fitted with a roller providing for the continuous rotation of the drive wheels while the vehicle is in motion. To accomplish this, the set of left-arm hydraulic cylinder 30D and right-arm hydraulic cylinder 30P, located rear side 8 of drawbar main tube 12, provide for the closing and opening of roller lifting arms 46D and 46P (see FIG. 3). In the example illustrated, the closing of the roller lifting arms 46D and 46P is accomplished by having hydraulic cylinders 30D and 30P rotate each of the duck feet toward each other, which is accomplished by urging the areas of each of duck-foot that is adjacent to the hydraulic cylinders outward towards the opposite far ends of drawbar main tube 12, causing the duck feet to rotate about their related pins toward the center portion of main tube 12 further causing the roller lifting arms 46D and 46P to rotate in toward front surface 6 of main tube 12, thus enabling arm parts 48D and 48P to be entered into the space between the two drive wheels, as illustrated in FIG. 4. With roller lifting arms 47D and 47P positioned, for example, in front of and just under each of the drive wheels, roller lifting arms 46D and 46P, once re-opened, can be positioned, for example, behind, and just under, each of the drive wheels. In this manner, once each drive wheel is embraced by one of the roller lifting arms sets, the drive wheels can be lifted. Furthermore, if the vehicle to be towed is parallel parked between two other vehicles, the driver can cause a drawbar positioning hydraulic cylinder to rotate drawbar 10 about king pin 15, thus, turning the drive wheels encased by the lifting roller-arms enabling the vehicle being towed to be easily and quickly removed from its parked spot. While the vehicle is being towed, the rollers on the secondary arms provide for the drive wheels supported on them to rotate in unison with the wheels on the ground protecting the drive train of the vehicle being towed. In the event that the vehicle is a four wheel drive, the roller-drawbar provides for the quick removal of the vehicle to a safe spot where the driver can stop and situate the vehicle being towed so that all four drive wheels are protected from damage.

Figure 7:
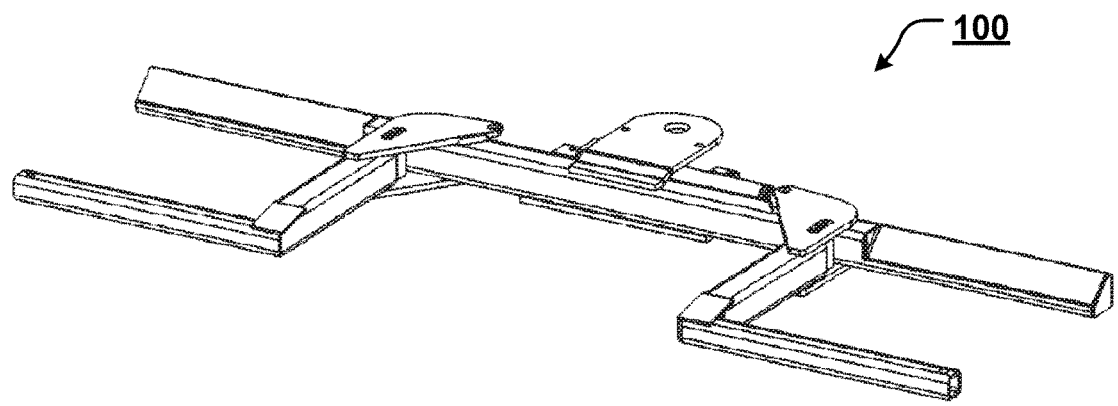
FIG. 7 is an oblique perspective view of a drawbar that can accept, but is not fitted with rollers.
Figure 8:
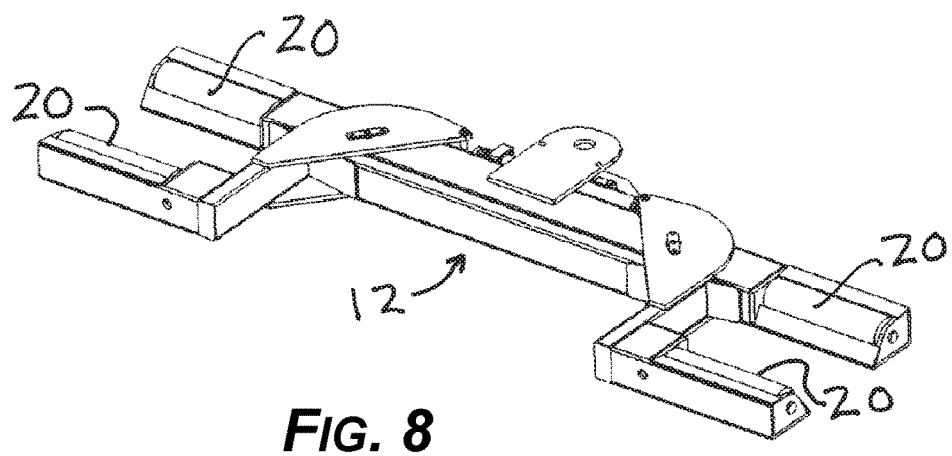
FIG. 8 is an oblique perspective view of the drawbar shown in FIG. 7 fitted with rollers.

There are tow truck operators who currently use a drawbar 100 that is not provided with the rollers that provide for the lifted and supported drive wheels of a vehicle being towed to roll as the vehicle is being towed according to the principles of the present invention, as illustrated in FIG. 7. To accommodate these operators, there are herein provided rollers that are structurally designed to be added onto the drawbar that is not provided with rollers as illustrated in FIG. 8. It is contemplated that the "add-on" rollers can be slid onto the drawbar units that were not built with rollers attached. The "add-on" rollers are provided with sleeve's in which the rollers are contained. These add-on rollers simply and rapidly slide over the driver's side and passenger's side L-arms and main tube and are attached thereto via bolts or pins, or the like, and are removable, if desired. By having this option any one of the currently available drawbar units can be converted into the drawbar of the present invention as described above. This is an affordable and simple way for repo men to convert their trucks into having the capability of towing all-wheel drive vehicles.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A wheel-lift assembly for towing a vehicle by lifting, supporting, and providing for rotation of said vehicle's drive wheels, comprising:
   a roller-drawbar having arms for lifting and supporting the drive wheels of a vehicle to be towed;
   a roller fitted onto each of said arms, wherein said rollers allow each of said drive wheels to rotate when said vehicle is set into motion; and
   a main tube having a first end and a second end, wherein an extension to said first end of said main tube comprises a first stationary lifting roller-arm and wherein an extension to said second end of said main tube comprises a second stationary lifting roller-arm, and wherein a roller is positioned within each stationary lifting roller-arm.

2. The assembly, as recited in claim 1, wherein said roller-drawbar further comprises an attachment fixture to rotatably and removeably attach said roller-drawbar to a wrecker.

3. The assembly, as recited in claim 2, wherein said attachment fixture is attached to a central area of said main tube.

4. The assembly, as recited in claim 3, wherein one end of each of two duck feet is rotatably attached to a hydraulic cylinder.

5. The assembly, as recited in claim 4, further comprising two lifting L-arms with each attached to another end of each of said duck feet so that said duck feet are caused to rotate by action of said hydraulic cylinders, and wherein said two lifting L-arms are caused to move toward each other.

6. The assembly, as recited in claim 5, wherein each lifting L-arm is equipped with a roller.

7. The assembly, as recited in claim 5, wherein each of said stationary lifting roller-arms is positioned spaced from and directly opposite to one of said two lifting L-arms providing lift and support structures to lift and support said drive wheels of said vehicle to be towed.

8. The assembly, as recited in claim 2, further comprising first and second hydraulic cylinder arms which are operatively attached to said attachment fixture, wherein each of said first and second hydraulic cylinder arms extend from each respective side of said attachment fixture, and wherein each of said first and second hydraulic cylinder arms is parallel and adjacent to said main tube.

9. The wheel-lift assembly as recited in claim 1, further comprising two grid plates about each of said rollers positioned within each stationary lifting roller-arm.

10. A drawbar with rollers to provide rotatability to drive wheels of a vehicle when said vehicle is being towed, comprising:
    a crossbar;
    a first stationary lifting arm and a second stationary lifting arm each with a roller positioned within each arm wherein said first stationary lifting arm is fixed to a first end of said crossbar, wherein said second stationary lifting arm is fixed to a second end of said crossbar wherein said rollers on said first stationary lifting arm and said second stationary lifting arm enable continuous rotation of said drive wheels of said vehicle to be towed when said vehicle is in motion;
    a first and a second foldable L-shaped lifting arm wherein said first foldable L-shaped lifting arm is connected to said first end of said crossbar and wherein said second foldable L-shaped lifting arm is connected to said second end of said crossbar and wherein each of said first and said second foldable L-shaped lifting arms comprises a roller;
    a first and a second duckfoot assembly rotatably connected to said crossbar and;
    a first and a second hydraulic cylinder operatively connected to said crossbar, wherein said first hydraulic cylinder is operatively connected to a first end of said first duckfoot assembly, wherein said first foldable L-shaped lifting arm is operatively connected to a second end of said first duckfoot assembly, wherein said second hydraulic cylinder is operatively connected to a first end of said second duckfoot assembly, wherein said second foldable L-shaped lifting arm is operatively connected to a second end of said second duckfoot assembly, wherein said first stationary lifting arm and said first foldable L-shaped lifting arm thus are operatively coupled forming a first wheel-lift support unit, wherein said second stationary lifting arm and said second foldable L-shaped lifting arm thus are operatively coupled forming a second wheel-lift support unit, and wherein said hydraulic cylinders in conjunction with said duck feet assemblies cause said inward rotation of said first and said second foldable L-shaped lifting arms when required for insertion between said drive wheels of said vehicle to be towed.

11. The drawbar, as recited in claim 10, wherein an attachment fixture that can rotatably and removeably attach said drawbar to a wrecker is fixed to a central area of said crossbar.

12. The drawbar, as recited in claim 11, wherein said attachment fixture comprises an upper tongue plate hingedly attached, by a hinge, to a lower tongue plate with each plate having a corresponding aperture through which a king pin is accepted providing a king pin pivot point for rotation of said drawbar about said king pin when required.

13. The drawbar, as recited in claim 10, wherein said first hydraulic cylinder is operatively attached to a first side of said attachment fixture.

14. The drawbar, as recited in claim 10, wherein said second hydraulic cylinder is operatively attached to a second side of said attachment fixture.

15. The drawbar as recited in claim 10, further comprising two grid plates about each roller of said first and said second stationary lifting arms.

16. A roller-drawbar for lifting and supporting drive wheels of a vehicle to be towed, comprising:

a main bar;

a first end of said main bar comprising a first stationary wheel-lift and support arm equipped with a roller positioned within said arm of said first end of said main bar;

a second end of said main bar comprising a second stationary wheel-lift and support arm equipped with a roller positioned within said arm of said second end of said main bar;

a first foldable wheel-lift and support L-shaped arm having a first part and a second part, wherein said second part comprises a roller; and a second foldable wheel-lift and support L-shaped arm having a first part and a second part, wherein said second part comprises a roller, wherein each first part extends perpendicularly from, and is rotatably attached to, said main bar; wherein each second part is attached to each respective first part so as to be parallel to and spaced from each of said stationary wheel-lift and support arms thus forming two wheel mount sets that each can lift and support said drive wheels of said vehicle being towed when said vehicle is being towed and said rollers allow said drive-wheels of said vehicle being towed to rotate when said vehicle is in motion being towed.

17. The roller-drawbar, as recited in claim 16, further comprising an attachment fixture to rotatably and removeably attach said roller-drawbar to a wrecker or tow truck, wherein said attachment fixture is attached to a central area of said main bar.

18. The roller-drawbar, as recited in claim 16, wherein a hydraulic cylinder arm is operatively attached to and extends from each side of said attachment fixture to be parallel to and adjacent to said main tube.

19. The roller-drawbar, as recited in claim 16, further comprising two duck feet each having a first end rotatably attached to one of said two hydraulic cylinders and each having a second end attached to one of said foldable wheel-lift and support L-shaped arms.

20. The roller-drawbar as recited in claim 16, further comprising two grid plates about said rollers of said first and second stationary wheel-lift and support arms.

* * * * *